US006192115B1

United States Patent
Toy et al.

(10) Patent No.: US 6,192,115 B1
(45) Date of Patent: Feb. 20, 2001

(54) OBTAINING INFORMATION ABOUT A CALLED TELECOMMUNICATIONS PARTY

(75) Inventors: Arthur Randall Toy, Lisle, IL (US); Christopher Lee Tsai; Liane Toy Tsai, both of Roswell, GA (US)

(73) Assignee: Lucent Technologies, Murray Hill, NJ (US)

( * ) Notice: Under 35 U.S.C. 154(b), the term of this patent shall be extended for 0 days.

(21) Appl. No.: 09/265,027

(22) Filed: Mar. 9, 1999

(51) Int. Cl.[7] .................................................. H04M 15/00
(52) U.S. Cl. .......................... 379/130; 201/127; 201/121; 201/114; 201/140; 201/115; 201/188
(58) Field of Search ............................... 379/93.23, 93.17, 379/142, 415, 219, 130, 114, 144, 127, 201, 220, 221, 229, 230, 121, 120, 140, 222, 207, 354; 455/407, 456, 457, 436

(56) References Cited

U.S. PATENT DOCUMENTS

| 5,303,297 | * | 4/1994 | Hillis | 379/114 |
|---|---|---|---|---|
| 5,473,671 | * | 12/1995 | Partridge, III | 379/142 |
| 5,515,426 | * | 5/1996 | Yacenda et al. | 379/142 |
| 5,559,868 | * | 9/1996 | Blonder | 379/142 |
| 5,559,871 | * | 9/1996 | Smith | 379/115 |
| 5,602,907 | * | 2/1997 | Hata et al. | 379/114 |
| 5,608,788 | * | 3/1997 | Demlow et al. | 379/142 |
| 5,768,686 | * | 6/1998 | Leblanc et al. | 455/456 |
| 5,859,902 | * | 1/1999 | Freeman | 379/144 |
| 5,864,612 | * | 1/1999 | Strauss et al. | 379/142 |
| 5,915,005 | * | 6/1999 | He | 379/115 |
| 5,920,614 | * | 7/1999 | Osman et al. | 379/140 |
| 5,926,537 | * | 7/1999 | Birze | 379/252 |
| 5,930,343 | * | 7/1999 | Vasquez | 379/115 |
| 5,930,344 | * | 7/1999 | Relyea et al. | 379/126 |
| 5,937,045 | * | 8/1999 | Yaoya et al. | 379/130 |
| 5,940,493 | * | 8/1999 | Desai et al. | 379/201 |
| 5,978,455 | * | 11/1999 | Johnson et al. | 379/112 |
| 6,005,927 | * | 12/1999 | Rahrer et al. | 379/142 |

* cited by examiner

*Primary Examiner*—Curtis A. Kuntz
*Assistant Examiner*—Rexford Barnie
(74) *Attorney, Agent, or Firm*—Werner Ulrich

(57) ABSTRACT

Apparatus and a method for providing a caller with information about a called party. In one preferred embodiment, the information includes information concerning the charges to be incurred in making a call to the called party. Advantageously, in an environment wherein number portability allows a call which previously was a local call, to become a toll call because the called party has made a geographic move, without changing the called party's telephone number. For wireless service, in those cases in which the caller pays at least a part of the charges, and the charges for a call to a roamer are different if the roamer is locally found than if the roamer is remotely located, this service allows a caller to decide on whether to complete a call, and if the decision is made to complete a call, on what length call to aim for.

15 Claims, 2 Drawing Sheets

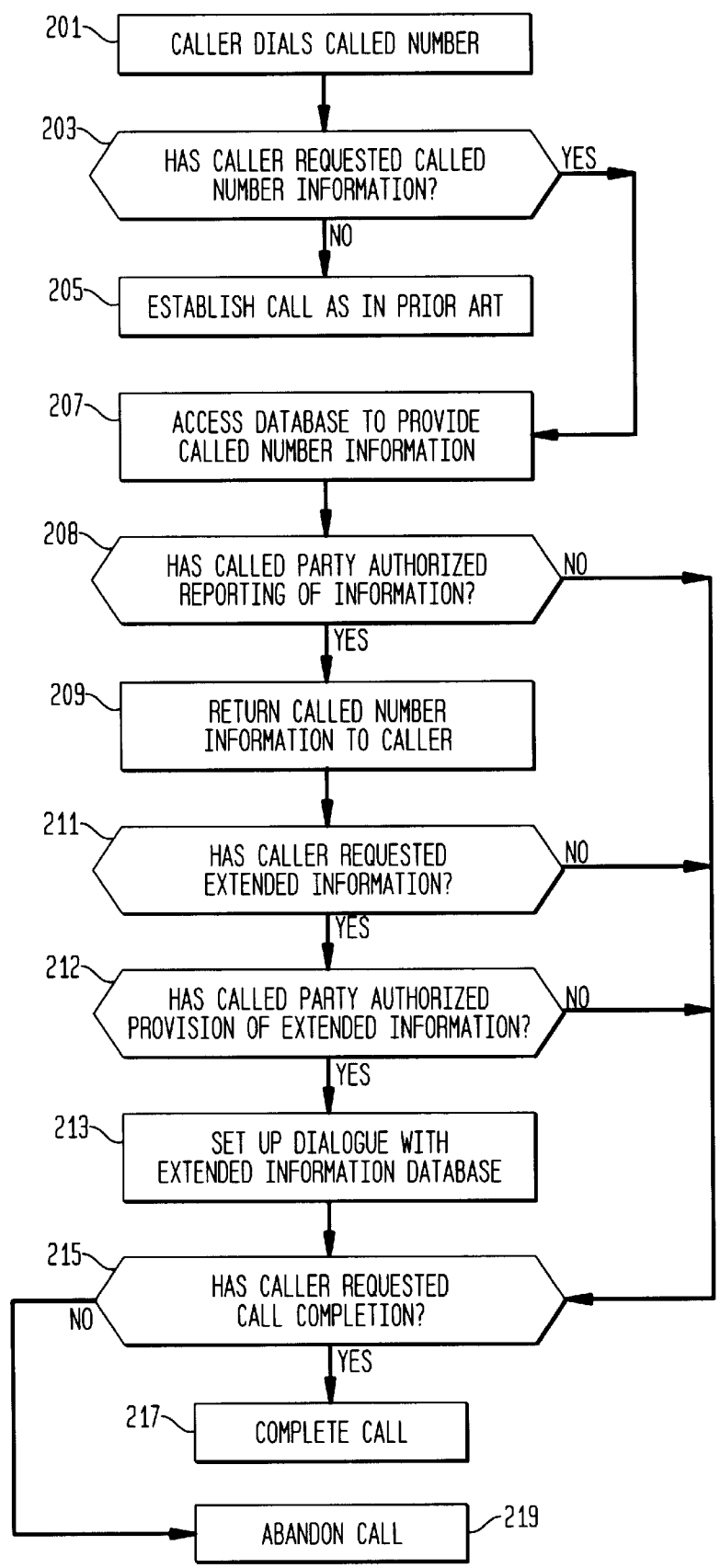

OBTAINING INFORMATION ABOUT A CALLED TELECOMMUNICATIONS PARTY

TECHNICAL FIELD

This invention relates to providing information about telecommunications customers to other telecommunications customers.

Problem:

As the telephone monopoly for local service is being challenged, requirements have grown for various types of number portability arrangements for telecommunications customers, such as telephone and cellular wireless station customers. In order to allow competitors to enter the field, it is important that telephone customers not be required to change telephone numbers, i.e., be able to "port" their telephone numbers, in order to switch telephone providers; a telephone number is a valuable asset because it is known by many people, and changes in telephone numbers are, therefore, costly to the party whose telephone number is being changed.

Along with the requirement for number portability in moving from one service provider to another, there has begun to be pressure for number portability as telephone customers move geographically. Initially, number portability is likely to be restricted to movements within a local area transport area, (LATA), but eventually, it is likely that there will be a requirement for number portability for customers who move outside their present LATA.

In the case of wireless customers, many such customers subscribe to roamer service, which permits these customers to move outside their basic service area, and still receive service, both incoming and outgoing. If the calling party were required to pay some, or all of the charges for a call to such a roamer, the calling party would be interested in knowing whether higher charges are likely to be incurred.

A problem which has resulted, and is likely to further result from these moves, is that the caller is no longer sure of where the called party is to be found, and consequently, that the charges are likely to be for a call to that party.

Solution:

The above problem is solved, and an advance is made over the teachings of the prior art in accordance with our invention, wherein the caller who dials a land-based telephone number or a wireless number, can receive information about the called party. If necessary, in response to receipt of a call by a serving switching system, a query is made of a database to provide information, and that information is then returned to the caller in a display, or announcement. Advantageously, the display, or announcement, can provide information to the caller which can help the caller decide whether or not to make the call, and possibly, whether to limit the length of the conversation if the caller decides to make the call.

Note that there are many diverse services which provide a called party with information about the calling party. The most common is calling line identification, which provides the identity of a caller to a called party in a display on the called party's telephone. The identity of the calling party has also been used by businesses to call up a display concerning the account activity of the caller, based on the calling line identification. In one application of this type of arrangement, a caller to a real estate company who fails to inhibit his/her calling line identification, triggers a query of a proprietary database which provides the real estate agent with information about such matters as the caller's mortgage amount and status. None of these services, however, provide a calling party with information about the called party.

In accordance with one preferred embodiment, the caller is provided with sufficient information to determine whether the call is a local or a toll call. This arrangement minimizes intrusions on the privacy of the called party, and provides information needed by the caller to help determine the decision as to whether a call should be completed. While this arrangement is probably adequate for the Continental United States, wherein toll calls typically have a standard charge that is almost independent, or entirely independent of the distance between calling and called parties, in other countries, or in International Networks for places like Europe, additional information to identify a charge rate can also be provided. For example, in European systems, a pulse metering rate required by the telephone network in order to charge the call, can fully inform the caller of charges to be incurred on the call.

In accordance with another feature of Applicant's invention, the called party's name and/or location, (useful for locating cellular subscriber roamers), can also be provided; in the case of cellular roamers, the location can be the location wherein the roamer was most recently registered, or preferably, the present location, as determined by available techniques for locating a wireless station within a few hundred meters, can be provided to the caller. This type of service can be useful even if number portability is not offered in an area identified by a called land-based, or wireless telephone number.

In accordance with another feature of this invention, when more detailed information is provided to the caller, the called party has options for suppressing the reporting of such information to callers. The called party can suppress such information for all incoming calls either on a permanent basis, or on the basis of a dialed request, (with the option of a dialed deletion of the request); or can selectively provide the information to a pre-assigned group of telephone numbers, or deny the information to a pre-assigned group of telephone numbers, (screening). Advantageously, those telephone customers who do not wish to provide such information are not required to do so, but other telephone customers will have their information available to callers.

A service which will soon be introduced, for example, flexible alerting, allows a call to a "pilot" directory number to be completed to one of several telephone stations, such as a business location telephone, a cellular telephone, and a home telephone. For called customers who will have this type of service, according to the principles of this invention, the caller can be provided with the requested information concerning all possible terminating numbers before allowing the call to be completed, and/or with the information concerning the number that actually answers the call after the call has been completed.

In accordance with another feature of this invention, the information can be provided to the caller on every call; on calls which the caller dials a prefix; on "no" calls; on a predefined list of numbers, or on all numbers except such a predefined list; or on a switchable on-off basis under the control of the caller; the selection is made based on the class of service of the caller. Correspondingly, the telephone operating company would either charge a flat rate, a rate per use, or nothing, in case the caller did not wish to use the service.

In accordance with another feature of Applicants' invention, the called party can control the information to be provided to the caller. This control can be complete, (no information supplied), or selective, (certain information denied); can be for all callers, for selected callers, or for all but selected callers, the caller being identified by a calling number identification; can be turned off or on by the called party.

In accordance with another feature of the invention, if the caller wishes to have detailed information, and the operating company provides such information, then the information would be provided in response to specific requests keyed by the caller. Advantageously, this allows the caller to receive specific information for some, but not all calls.

BRIEF DESCRIPTION OF THE DRAWING

FIG. 2 is a flow diagram, illustrating the method of the invention.

DETAILED DESCRIPTION

Figure 1:
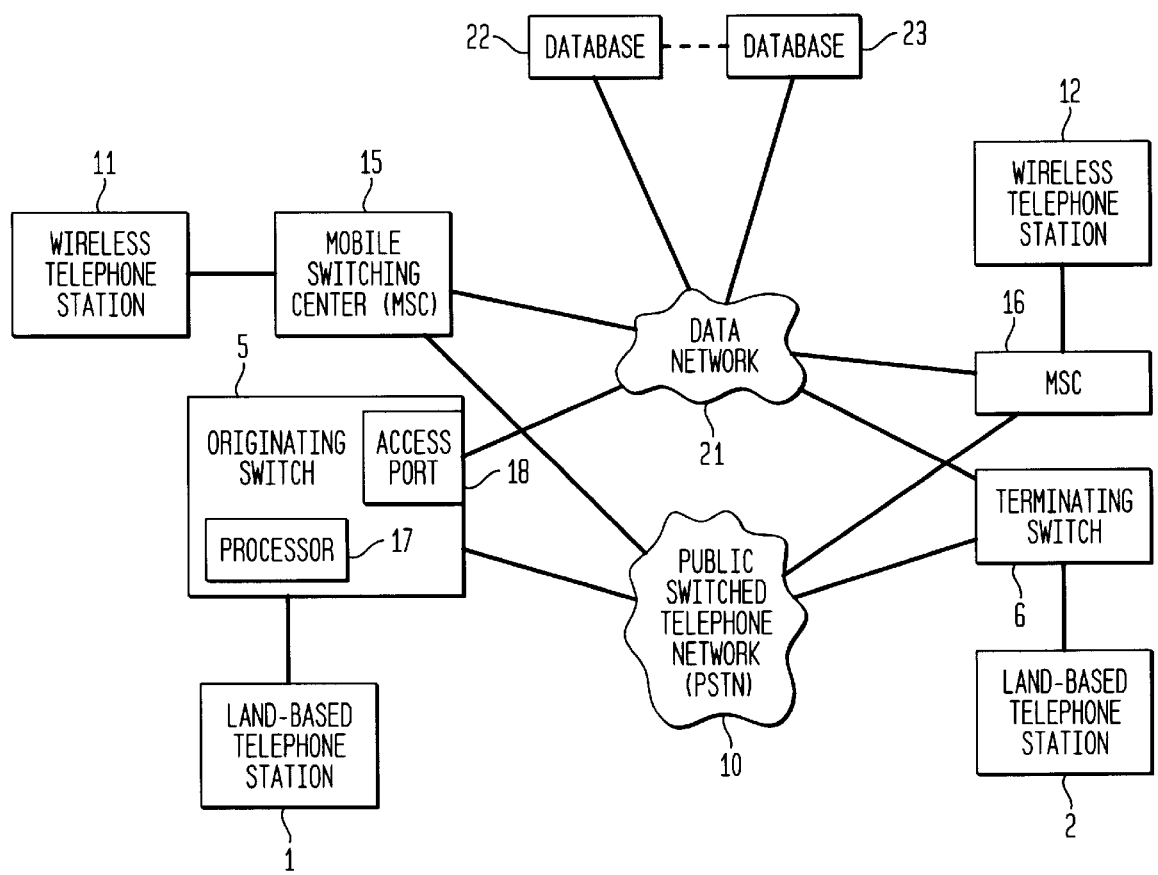
FIG. 1 is a block diagram, illustrating the operation of Applicants' invention.

FIG. 1 is a block diagram, illustrating the operation of Applicant's invention. A land based caller 1, calls a land based telephone station 2. The caller is connected to an originating switch 5, having a processor 17 to control its actions, and the called party is served by terminating switch 6. The originating and terminating switches are interconnected by the Public Switched Telephone Network 10, (in special cases, the originating and terminating switch may be the same, or may be directly connected by trunks). If the caller wishes to make a query, the originating switch sends the data message from its access port 18, via the data network 21, to database 22, . . . , 23. The data network 21 is a Common Channel Signaling Network, (CCS7), used for signaling between switches, and between switches and telecommunications databases. With number portability, a properly enhanced originating switch 5, knows the particular database in which the sought information is to be found, or receives information from that database which will steer another request to the correct database. Alternatively, a request can be sent to the terminating switch 6, which will then respond with the desired information. The query can go switch-to-switch or, with suitable enhancements of the database, can go via the database.

The desired called party information can be on the same database that is used for routing the call, or it can be on a different database. The latter database can be identified by the database used for routing or by the terminating switch.

More generally, the Public Switched Telephone Network also has access to the data network. An intermediate switch in the connection between a caller and a called party, or the candidate terminating switch, may be the source of the query. For example, in some cases a call may be routed initially to the switch that serves the NPA-NXX code of the called party, and it may be that switch which recognizes that the called party has been ported to another switch, and that the data for the called party resides in a database 22, . . . ,23.

At any rate, the desired information is returned from one of the databases 22, . . . 23, via data network 21, to the originating switch 5, which then converts the information received in the returned data message into an announcement, or a voice band message for activating a display, or in the case of an Integrated Services Digital Network, (ISDN), telephone sends a data message over the D-channel to activate a display in the ISDN telephone. Responsive to this message, the calling customer then requests that the telephone connection be completed, or optionally, simply does not hang up, and permits the call to be completed. The caller may also be a wireless caller, such as caller 11, served by mobile switching center 15; similarly, the called party can be a wireless station, such as station 12 served by mobile switching center 16. The mobile switching centers are interconnected by the public switched telephone network 10, and also have access to data network 21.

FIG. 2 is a flow diagram, illustrating the operation of Applicant's invention. A caller dials a called number, (Action Block 201). Test 203 is used to determine whether the caller has requested called number information. The service provider may elect to provide this feature to all callers served by the service provider. The test can be based on a class of service of the caller, whereby: the caller always requests this information; a prefix dialed by the caller as an indication of a request for the called number information; a switchable toggle for the service, under the control of the caller; the information is to be requested for all calls to a specified group of telephone numbers, or for all calls except those to a specified group; or some more specialized class of service requesting called number information for selected, or all but selected, types of calls, for example, for all calls except those made using speed calling. If the customer has not requested called number information, then the call can be established as in the prior art, (Action Block 205). If the customer has requested called number information, then the appropriate database to provide this called number information is accessed, (Action Block 207). This database can be accessed via the Common Channel Signaling Network, directly from the originating switch, or from an intermediate switch of a connection to the called customer, or from the terminating switch connected to the called customer. In some cases, a first database is accessed, and the first database indicates another database must be queried; if so, the other database is queried either by sending a message directly from the first database to the second database, or by sending a message back to the querying switch, which in turn, issues another query for the called customer data.

Test 208 is used to determine whether the called party has authorized the database to provide the requested information to the caller. The called party can specify: that the information is to be provided only to a specified group of callers, or to all except a specified group; that only selected portions are to be reported, or that all but selected portions are to be reported; that information is to be provided or suppressed, based on a dialed indication by the called party. If such authorization has not been provided or has been denied, Action Blocks 209 and 213 are bypassed, and Test 215, described hereinafter, is entered. If the called party has not been denied access to this information, the called number information is then returned to the originating switch, which returns either a data message for display at the calling customer's station, or converts the data returned from the database into an announcement, (Action Block 209). Test 211 is then used to determine whether the caller requests extended information, i.e., information for example, beyond the basic location information provided to the caller. If so, Test 212 determines whether the called party has authorized the database to provide this additional information. If the result of Test 212 is negative, Test 215 is entered. If the result of Test 212 is positive, then Action Block 213 is executed. In Action Block 213, the caller can request extended information by dialing a special prefix; if the caller has requested the extended information, then a dialogue is established with the database that contains the extended information for the called customer. The most simple type of dialogue is one in which prompting announcements are provided to the caller, and the caller responds by keying a Dual-tone Multifrequency (DTMF) response, or by saying a word, or words that are then recognized using speech recognition. The originating switch converts between messages to the database and announcements to the caller, and between DTMF or voice signals from the caller and messages to the database.

After the dialogue with the extended database has been completed, or in response to a negative result of Test 211, Test 215 is performed to determine whether the caller has requested call completion. The request for call completion is performed most readily through the dialing of a DTMF signal. If the caller has requested completion of the call, the call is completed, (Action Block 217); otherwise, the call is abandoned, (Action Block 219).

For flexible alerting type calls, wherein a plurality of called telephone stations are alerted, the caller can make a decision to complete the call, (Test 215), if the caller receives information about all numbers to be alerted. If the caller waits until the first called station answers, it is too late, (using present technology switching systems), to abandon the call, but at least the caller has information to make a decision on whether the call should be brief.

The above is a description of one preferred embodiment of Applicant's invention. Many other embodiments can be derived by those of ordinary skill in the art, without departing from the scope of the invention. Accordingly, the invention is only limited by the attached claims.

What is claimed is:

1. In a telecommunications network, a method for obtaining information about a telecommunications user, comprising the steps of:
    responsive to receipt of a called wireline directory number from a calling party, sending a query to a database, said database for storing data for the called directory number;
    responsive to receipt of said query, reporting selected portions of said data for said called directory number to said calling party; and
    responsive to an indication from said calling party, completing a call to a called telephone station identified by said called directory number;
    wherein said data comprises location information of said called party, said location information generated by a wireline telecommunications network serving said called directory number;
    wherein said data further comprises information concerning a call from said calling party to said called party wherein said called party can request suppression of said location information but not of said information concerning charges for a call from said calling party to said called party.

2. The method of claim 1, wherein the step of requesting suppression of said location information comprises the step of requesting a class of service wherein said location information is always suppressed.

3. The method of claim 1, wherein the step of requesting suppression of said location information comprises the step of requesting suppression of said location information by the called party dialing a special code.

4. The method of claim 1, wherein the called party requests suppression of said location information for a selected group of calling parties.

5. The method of claim 1, wherein said called party requests suppression of said location information for all but a selected group of calling parties.

6. In a telecommunications network, a method for obtaining information about a telecommunications user, comprising the steps of:
    responsive to receipt of a called directory number from a calling party, sending a query to a database, said database for storing data for the called directory number;
    responsive to receipt of said query, reporting selected portions of said data for said called directory number to said calling party; and
    responsive to receipt of an indication from said calling party, completing a call to a called telephone station identified by said called directory number;
    wherein said called directory number is for alerting a plurality of telecommunications stations, each having a different telephone number and said data is reported for said plurality of stations.

7. In a telecommunications network, a method for obtaining information about a telecommunications user, comprising the steps of:
    responsive to receipt of a called directory number from a calling party, sending a query to a database, said database for storing data for the called directory number;
    responsive to receipt of said query, reporting selected portions of said data for said called directory number to said calling party; and
    responsive to an indication from said calling party, completing a call to a called telephone station identified by said called directory number;
    wherein said called directory number is for alerting a plurality of telecommunications stations, and said data is reported for a first of said plurality of telecommunication stations to answer said call.

8. In a telecommunications network, a method for obtaining information about a telecommunications user, comprising the steps of:
    responsive to receipt of a called wireline directory number from a calling party, sending a query to a database, said database for storing data for the called directory number;
    responsive to receipt of said query, reporting selected portions of said data for said called directory number to said calling party; and
    responsive to an indication from said calling party, completing a call to a called party identified by said called directory number;
    wherein the step of sending a query comprises the step of said calling party controlling whether or not to send said query;
    wherein the step of controlling comprises the step of said calling party supplying a request for a class of service specifying types of calls for which said query should be made;
    wherein the step of controlling comprises the step of:
       said calling party supplying a list of a group of telephone numbers for which said query should be made or should not be made.

9. In a telecommunications network, apparatus comprising:
    a telecommunication switching system comprising:
       apparatus for obtaining information about a telecommunications user comprising:
       means, responsive to receipt of a called directory number from a calling party, for sending a query to a database;
       means, responsive to receipt of a response to said query, for reporting selected portions of said data for said called directory number to said calling party; and
       means, responsive to an indication from said calling party, for completing a call to a called party identified by said called directory number;

said network further comprising:
    data network means for interconnecting said telecommunications switching system with said database means; and
    database means for storing said data for said called directory number;
    said database means for responsive to receipt of said query for generating said response comprising said data for said called directory number; and
    transmitting said response over said data network means to said telecommunications switching system;
    wherein said data about a called directory number comprises data for a plurality of telephone stations having different telephone numbers alerted when said called directory number is received.

10. In a telecommunications network, apparatus comprising:
    a telecommunication switching system comprising:
        apparatus for obtaining information about a telecommunications user comprising:
            means, responsive to receipt of a called directory number from a calling party, for sending a query to a database;
            means, responsive to receipt of a response to said query, for reporting selected portions of said data for said called directory number to said calling party; and
            means, responsive to an indication from said calling party, for completing a call to a called party identified by said called directory number;
    said network further comprising:
        data network means for interconnecting said telecommunications switching system with said database means; and
        database means for storing said data for said called directory number;
        said database means for responsive to receipt of said query for generating said response comprising said data for said called directory number; and
        transmitting said response over said data network means to said telecommunications switching system;
    wherein data for a first of said plurality of telephone stations to answer a call is reported.

11. In a telecommunications network, a method for obtaining information about a telecommunications user, comprising the steps of:
    responsive to receipt of a called directory number from a calling party, sending a query to a database of said network, said database for storing data for the called directory number;
    responsive to receipt of said query, reporting selected portions of said data for said called directory number to said calling party; and
    responsive to receipt of an indication from said calling party, completing a call to a called telephone station identified by said called directory number;
    wherein the reporting step comprises accessing data for said called directory number in said database;
    transmitting a message comprising said selected portions of said data from said database to a switch serving said calling party; and
    reporting said selected portions of said data to said calling party;
    wherein said step of accessing said data for said called directory number in said database can be selectively suppressed for pre-selected callers under the control of a called party.

12. The method of claim 11, wherein the step of selectively suppressing comprises the step of the called party dialing a special code.

13. The method of claim 11, wherein the step of selectively suppressing comprises the step of providing said data to a selected group of calling parties.

14. The method of claim 11, wherein the step of selectively suppressing comprises the step of providing said data to all but a selected group of calling parties.

15. In a telecommunications network, a method for obtaining information about a telecommunications user, comprising the steps of:
    responsive to receipt of a called wireline directory number from a calling party, sending a query to a database, said database for storing data for the called directory number;
    responsive to receipt of said query, reporting selected portions of said data for said called directory number to said calling party; and
    responsive to an indication from said calling party, completing a call to a called party identified by said called directory number;
    wherein the step of sending a query comprises the step of said calling party controlling whether or not to send said query;
    wherein the step of controlling comprises the step of said calling party supplying a request for a class of service specifying types of calls for which said query should be made;
    wherein the step of controlling comprises the step of:
        said called party supplying a list of a group of telephone numbers for which said query should be responded to or should not be responded to.

* * * * *